United States Patent

[11] 3,575,191

| [72] | Inventors | David G. Rees<br>Telford;<br>David G. Grier, Elkins Park; Daniel<br>Meiklejohn, Hartsville, Pa. |
|---|---|---|
| [21] | Appl. No. | 847,991 |
| [22] | Filed | Aug. 6, 1969 |
| [45] | Patented | Apr. 20, 1971 |
| [73] | Assignee | Fischer & Porter Co.<br>Warminster, Pa. |

[54] PNEUMATIC CONTROLLER OF MOTION BALANCE TYPE
11 Claims, 3 Drawing Figs.

[52] U.S. Cl. ..................................................... 137/85, 137/86
[51] Int. Cl. ........................................................ F15b 5/00, G05d 16/00
[50] Field of Search ........................................... 137/85, 86

[56] References Cited
UNITED STATES PATENTS

| 3,018,763 | 1/1962 | Goerke ........................ | 137/85X |
| 3,047,002 | 7/1962 | Jaquith ........................ | 137/85 |
| 3,095,003 | 6/1963 | Dyson .......................... | 137/86 |
| 3,354,895 | 11/1967 | Wisemann ................... | 137/86 |
| 3,428,069 | 2/1969 | Undery ......................... | 137/85 |

*Primary Examiner*—Alan Cohan
*Attorney*—Michael Ebert

ABSTRACT: A pneumatic controller provided with a flapper-nozzle assembly and an actuator-arm assembly. The flapper-nozzle assembly includes a flapper having a blade section and a flat tab section such that deflection of the tab section causes the blade section to move relative to the orifice of a nozzle to more or less throttle the rate of fluid flow through the nozzle. The flapper-nozzle assembly is rotatable, whereby the angular orientation of the plane of the tab section may be varied with respect to a Y-axis passing through the nozzle. The actuating-arm assembly includes a swizzle stick mounted on a transverse staff extending along an X-axis perpendicular to the Y-axis, the swizzle stick having a ball at one end thereof engaging the tab section of the flapper. The stick is caused to swivel on the staff about the X-axis as a function of an applied error signal motion, and is also caused to shift along the X-axis as a function of a feedback signal motion whereby the position of the ball is the resultant of the error and feedback signals, and the degree to which it deflects the tab section of the flapper depends on the angle of this section with respect to the Y-axis.

PNEUMATIC CONTROLLER OF MOTION BALANCE TYPE

BACKGROUND OF INVENTION

This invention relates generally to pneumatic controllers responsive to an input motion to produce a change in fluid pressure which acts upon a process variable to maintain it at a predetermined value, and more particularly to an improved proportional mechanism of the motion balance type for such controllers.

A pneumatic controller is a component in a process control loop which is subject to disturbances, the controller acting in conjunction with other devices to maintain a process variable at a desired value. To accomplish this purpose, the pneumatic controller receives, in terms of motion, both the desired value or set point and the process variable, the controller functioning as a motion balance device to position a final control element which directly affects the process variable being controlled.

The variable controlled may be flow rate, temperature, pressure, humidity, liquid level, viscosity, or any other process variable. Thus the input motion of the controller may be obtained from a rate-of-flow meter or rotometer whose reading is translated into a mechanical motion which is applied to the input lever of the pneumatic controller.

The pneumatic output of the controller may be impressed upon a flow-regulating valve or damper, operated by a pneumatic motor, which valve or damper is opened or closed, or whose intermediate position is determined, by the pneumatic controller. It is also possible to operate final control elements in other forms, such as variable-speed belt feeders. By "pneumatic controller" as used herein, is meant a fluid-operated controller, which fluid may be air or gas.

Automatic controllers are generally classified by the types of control action or the modes of control they provide. The modes most commonly used in pneumatic controllers are proportional position, proportional plus reset, proportional plus rate, proportional plus reset plus rate, differential gap, and on-off only.

In the proportional-position mode, the actuating signal applied to the controller causes a change in output pressure proportional thereto. The degree of change in output pressure for a given change in actuating signal depends on the proportional band of the device. "Proportional band" is the range of the controlled variable which corresponds to the full operating range of the final control element. Reset action causes a change in output pressure proportional to the time integral of the actuating signal, whereas rate action causes the output pressure to vary as the rate of change of the actuating signal. Rate action is used in conjunction with proportional position and proportional plus reset actions.

In the on-off mode, the action is that of a switch which snaps to one position when the error is positive (set-point signal higher than process), and to another position when the error is negative. It is usually designed to operate with as small a crossover or detent zone as possible. Differential gap is a modification of on-off control with two output valves (on and off), but the switching action occurs only after the error input passes through a crossover zone or differential gap.

In the prior U.S. Pat. to Wiseman No. 3,354,895, assigned to Fischer & Porter Co., the assignee herein, there is disclosed a pneumatic controller which is readily adaptable to the several modes of control action indicated above. In the controller described in this patent, the position of a flapper relative to a nozzle is adjusted to convert changes in motion to changes in fluid pressure.

This is accomplished by applying an error signal to a semicircular input trackway to cause a rotation thereof about a first axis as a function of this signal, a feedback signal being applied to effect movement of a semicircular feedback trackway pivoted at its end for movement with respect to a second axis perpendicular to the first axis. Cooperating with the two trackways is a beam assembly mounted for rotation about a third axis perpendicular to the first two axes and including major and minor beams which ride respectively on the input and feedback trackways and are raised and lowered thereby. The mechanical arrangement is such that the motion of the major beam is the resultant both of input and feedback signals. The major beam is operatively coupled to the flapper to effect control thereof and thereby vary the fluid pressure as a function of these signals.

While a pneumatic controller of the type disclosed in said patent operates reliably and efficiently, it is relatively complex in structure and expensive to manufacture. The need exists for a simple, low cost, pneumatic controller which carries out all of the functions of the prior art type but in a less complicated mechanical structure.

BRIEF DESCRIPTION OF INVENTION

In view of the foregoing, it is the primary object of the present invention to provide a proportional mechanism of the motion balance type, which is of simple, efficient, rugged and compact design, and which is readily adjustable for a broad range of process conditions, and which may be easily dismantled for purposes of repair or adjustment.

A more specific object of the invention is to provide a pneumatic controller which is readily adaptable to various modes of control action. A significant feature of the invention is that it includes a mechanism for obtaining a wide range of adjustable values of the proportional band, the proportional band mechanism being capable of 360° rotation allowing proportional and differential gap actions to be obtained with no change of parts.

Briefly stated, these objects are accomplished in a pneumatic controller comprising a flapper-nozzle assembly and an actuating-arm assembly. The flapper-nozzle assembly is provided with an L-shaped flapper having a blade section and a flat tab section which is pivoted at the junction of the sections such that deflection of the actuating section causes the blade section to move relative to the orifice of a nozzle to more or less throttle the rate of fluid flow through the nozzle, the flapper-nozzle assembly being rotatable, whereby the angular position of the plane of the tab section is adjustable relative to a Y-axis passing longitudinally through the nozzle.

The actuating-arm assembly includes a swizzle stick mounted on a transverse staff extending along an X-axis perpendicularly intersecting the Y-axis, the swizzle stick having a ball at one end which engages the surface of the tab section of the flapper, the other end being operatively coupled to a linkage assembly causing the stick to swivel about the X-axis as a function of an error signal motion applied thereto. A feedback signal bellows is operatively coupled to one end of the staff, causing it to shift along the X-axis as a function of a feedback signal motion, whereby the position of the ball with respect to the tab section is the resultant of the error and feedback signals, and the effect of the ball position on the displacement of the flapper also depends on the angle of the tab section relative to the Y-axis.

BRIEF DESCRIPTION OF DRAWING

For a better understanding of the invention, as well as other objects and further features thereof, reference is had to the following detailed description to be read in conjunction with the accompanying drawing, wherein.

DESCRIPTION OF INVENTION

Figure 1:
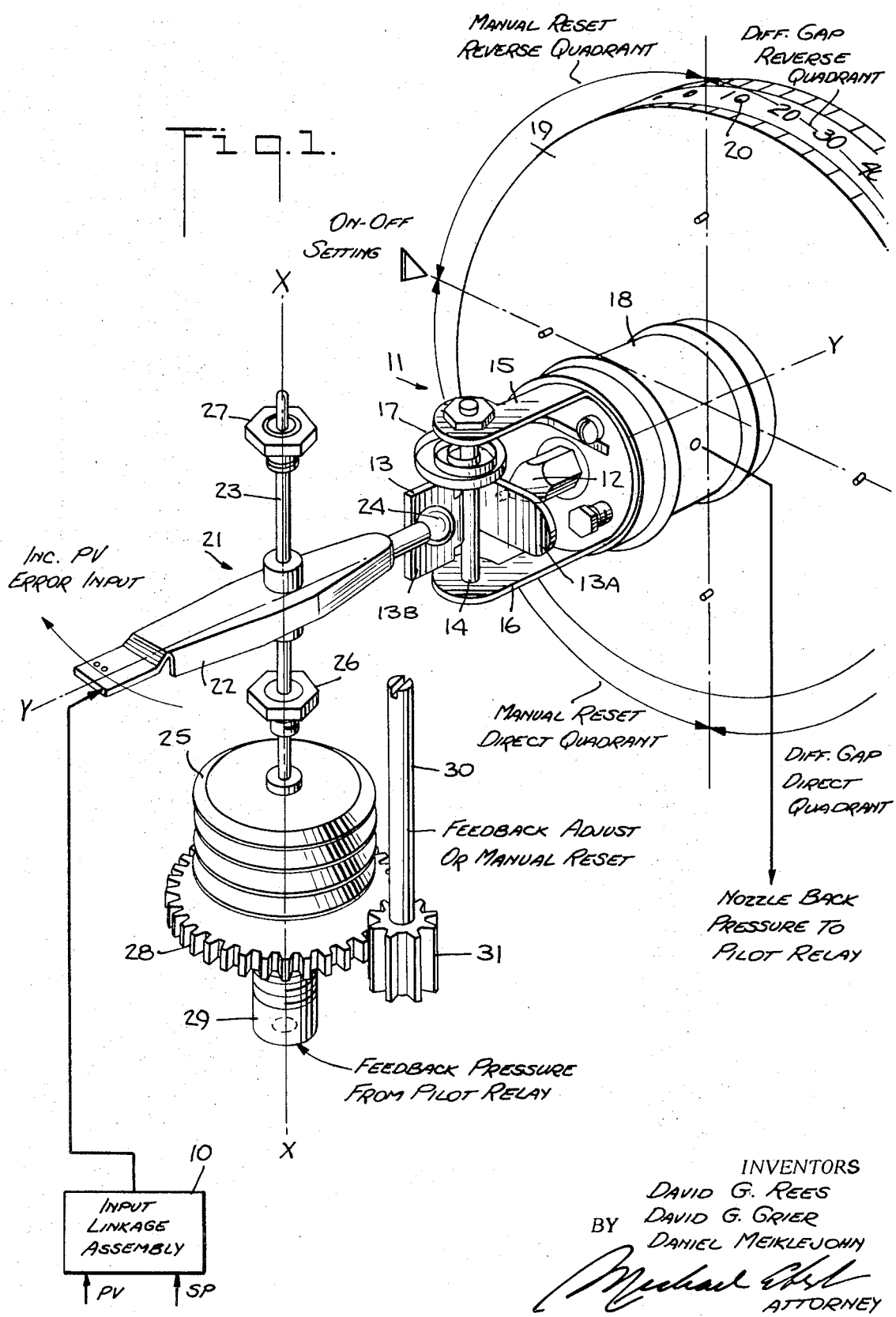
FIG. 1 schematically illustrates, in perspective, a pneumatic controller in accordance with the invention.

A motion balance pneumatic controller receives mechanical set-point and process information, and in response thereto, produces a pneumatic output signal that positions a final control element. A general description of how such controllers function in various modes may be found in the above-identified patent, as well as in the "Instruction Bulletin 53P-4500, Revision 1." published by Fischer & Porter Co. of Warminster, Pa.

For the controller to function properly, it must first be able to detect differences between an actual process variable *PV* and the desired process value or set-point *SP*. The difference between *PV* and *SP* is known as the input error signal. The input error signal is produced by an input linkage assembly, generally designated in FIG. 1 by numeral 10, which in practice, as explained more fully in the above-identified "Instruction Bulletin," may consist of two levers pivoted about a common point, with the process lever being further pivoted on the set-point lever to allow the process and set-point levers to detect any deviation of the two values.

The net position of the linkage 10 is therefore a measure of the error signal, the motion produced by the linkage constituting one input to the pneumatic controller. The structure of the error-detection linkage forms no part of the present invention.

The pneumatic controller employs a displacement-sensing device to convert small changes in physical displacement into related changes in fluid pressure. In the embodiment shown in FIG. 1, this is effected by a flapper-nozzle assembly, generally designated by numeral 11, and including a nozzle 12 operating in conjunction with an L-shaped flapper 13 having a blade section 13A and a flat tab section 13B. A pivot pin 14 is secured thereto at the junction of these sections.

Pin 14 is supported for rotation between jewelled bearings on trunnions 15 and 16, whereby blade section 13A of the flapper is moved toward or away from the orifice of nozzle 12 as the actuating section is deflected. Blade section 13A is normally urged toward the orifice by a spiral-wound spring 17.

The flapper and nozzle assembly 11 is mounted on one end of a cylinder 18 whose other end is attached to a handwheel 19 having a peripheral dial 20 thereon, which is graduated with a 360° scale. Rotation of wheel 19 causes the flapper-nozzle assembly to turn about a Y-axis which passes through the longitudinal axis of nozzle 12. The nozzle need not be in line with the Y-axis, but must at least be parallel thereto.

Consequently, the angular position of the plane of flat tab section 13B of the flapper relative to the Y-axis is varied as the handwheel is turned, so that in the course of a 360° rotation, the tab plane shifts from the horizontal above the Y-axis, to the vertical on one side of the Y-axis, to the horizontal below the Y-axis, to the vertical on the other side of the Y-axis, and finally back to the horizontal above the Y-axis. The angle of the plane of the tab section is more or less inclined relative to the horizontal at intermediate positions in the course of rotation.

Deflection of the tab section 13B of the flapper-nozzle assembly is effected by an actuator-arm assembly, generally designated by numeral 21. This assembly includes a swizzle stick 22 extending along the Y-axis and mounted on a transverse staff 23 which passes through the stick at about the midpoint thereof, the staff extending along an axis X, which intersects the axis Y at right angles. The arrangement is such that stick 23 may be swiveled with respect to the X-axis and also translated therealong.

Attached to one end of swizzle stick 22 is a spherical ball 24 which engages the surface of flat tab element 13B of the flapper. Operatively coupled to the other end of stick 22 is the input linkage assembly 10 to cause the stick to swing about the X-axis as a function of the input error signal, so that applied to the stick is a proportional error signal when the process variable and set-point pointers do not exactly coincide. In this way, the controller is changed only when a difference exists between set-point and process variable.

The controller output pressure is fed back through a volume to a feedback bellows 25 disposed directly below the swizzle stick 22, the longitudinal axis of the bellows being aligned with the X-axis. Staff 23 is carried in jewel bearings 26 and 27 disposed on either side of stick 22, the lower end of the staff resting on the face of bellows 25 so that as the bellows expands or contracts, the staff rises or falls along the X-axis.

In practice, a fluid pressure may be applied to the top end of staff 23 to impose a fixed contact force between the staff and bellows.

Bellows 25 is mounted on a gear 28 that is screwed onto a threaded post 29 in alignment with axis X. Bellows 25 may be raised or lowered by means of a shaft 30 which carries a pinion 31 intermeshing with gear 28. This adjustment may be used for calibration or to adjust the controller output level (manual reset).

As pointed out previously, handwheel 19 may be turned to change the angular position of cylinder 18 and of the flapper-nozzle assembly 11 mounted thereon about the Y-axis. By changing this angle, the amount of motion required by swizzle stick 23 of the actuator-arm assembly 21 to effect a given change in the flapper-nozzle air gap, may be varied. The direction of output pressure increase or decrease may also be changed by moving from quadrant to quadrant through 360° of permissible rotation. Thus, 0° to 90° is the differential gap-reverse quadrant, 90° to 180° is the differential gap-direct quadrant, 180° to 270° is the manual reset direct quadrant, and 270° to 360° is the manual reset reverse quadrant.

Therefore the proportional band of the controller may be varied from zero to infinity in both direct or reverse actions. In an actual embodiment, nozzle 12 may be turned in and out along axis Y on threads, and the flapper jewel supports on trunnions 16 and 17 may be tilted for making necessary calibration adjustment.

If the flapper-nozzle assembly is rotated by the proportional dial handwheel 19 so that the surface of flapper-tab section 13B in contact with ball 24 of swizzle stick 22 is substantially vertical, as shown in FIG. 1, vertical motion of the ball as a result of the action of feedback bellows 25 on staff 23 along the X-axis has very little influence on the flapper-nozzle clearance, and hence little effect on nozzle back pressure. In this position, input error signal changes are the principal factor in determining nozzle back pressure. Since little feedback effect can be felt by flapper tab 13B, this vertical position of the tab produces narrow proportional band action, in that small input signal changes result in large controller output changes.

Figure 2:
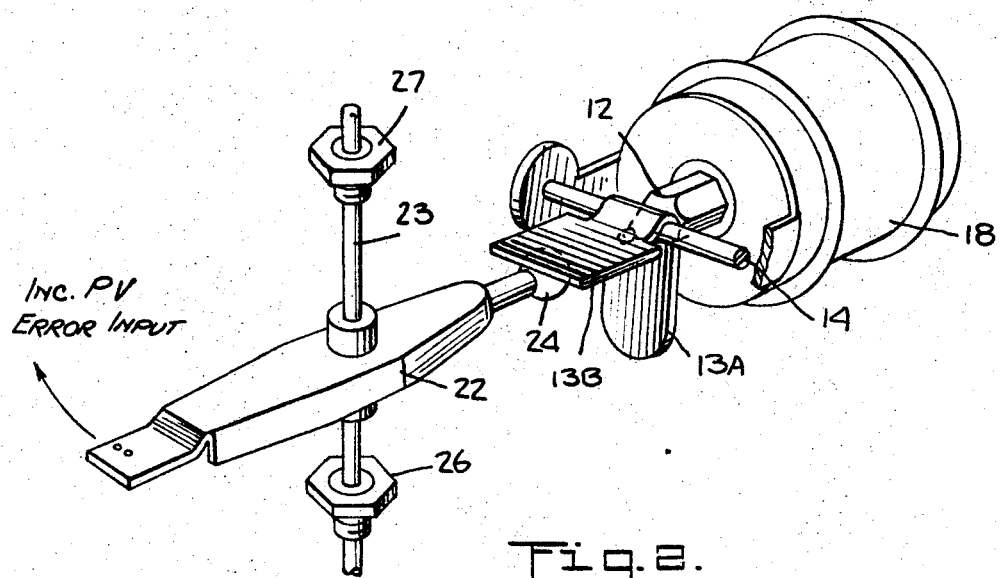
FIG. 2 illustrates the influence of the ball of the actuator-arm assembly on the flapper of the flapper-nozzle assembly when the plane of the tab of the flapper is horizontal.

But if the flapper-nozzle assembly is rotated clockwise so that the tab of the flapper is now in a horizontal position, as shown in FIG. 2, horizontal motion of the ball 24 about axis X due to change in error input has little effect on nozzle back pressure changes. In this position, the feedback system which moves the ball in the X direction is the main factor in determining nozzle back pressure and thus controller output. Consequently, relatively large error input changes are required to produce a unit change in nozzle back pressure when compared to those required to produce the same changes in nozzle back pressure when the flapper was nearly in its vertical position. Because large feedback effects are felt, this flapper position produces wide proportional band action, that is to say, large input signal changes result in small controller output changes.

Figure 3:
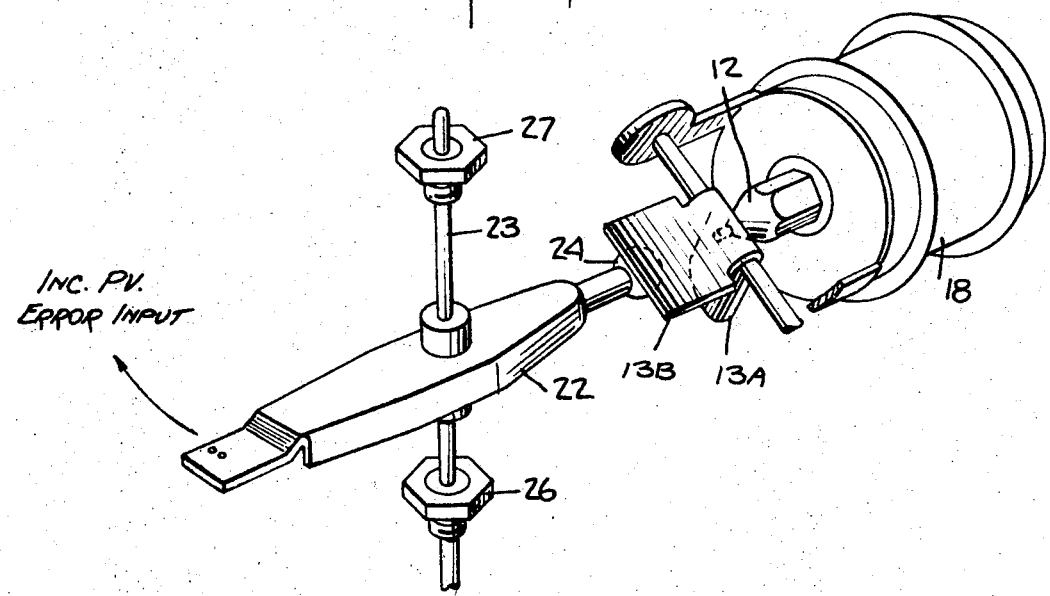
FIG. 3 illustrates the influence of the ball on the flapper when the plane of the tab is inclined with respect to the horizontal.

When the flapper-nozzle assembly is rotated to cause the plane of tab 13B to occupy a diagonal position, as shown in FIG. 3, which is intermediate the vertical and horizontal positions previously analyzed, the horizontal motion of the ball 24 about the X-axis due to changes in error input, has an effect depending on the steepness of the angle, and the vertical motion of the ball along the X-axis in response to changes in feedback also has a distinct effect, so that both input error signal and feedback signal changes are important factors in determining nozzle back pressure. Thus the combination of input motion and feedback motion produces a separate and distinct ball position, and in effect operates in a manner to position the ball along diagonal paths of the flapper-tab section.

Normally, a proportional controller without reset is aligned to produce a 9 p.s.i.g. (midscale for a 3—15 p.s.i.g. output) when process and set-point signals are equal. Therefore the controller will control only at the setpoint under one process load condition, and other conditions will control at some other value, producing an offset between the desired and actual control point. Automatic and manual reset are used to eliminate this effect.

In the proportional plus manual reset mode, the controller output, as a result of a change in the process from set point, is fed to the inside of feedback bellows 25, which moves the swizzle stick in a direction to restore the flapper to its original position, whereby the whole system comes to equilibrium once again at the new output level.

For operation in proportional plus manual reset plus derivative mode, the feedback line is divided into two parallel circuits. One line passes through a needle valve and into a volume, and the other line is dead ended into a bellows mounted within this volume. Another passage then connects the volume to the inside of the feedback bellows. Thus a change in output pressure is initially impeded by the needle-valve restriction, but is free to enter the derivative bellows. It expands, displacing air from the volume chamber into the feedback bellows, and holds it there until in time the pressure equalizes through the needle valve.

For operation in the proportional plus automatic reset mode, the divided feedback circuit is used in a different manner. The same needle valve to volume line is employed, but in the other parallel passage, the derivative bellows is replaced with a volume cap containing an air passage connected to the chamber surrounding the feedback bellows. The volume chamber is connected to the inside of the bellows as before, so that there is now a positive and negative feedback motion from the same feedback element. The negative feedback pressure, which is outside the feedback bellows, is deliberately allowed to bleed at the actuating arm staff bearing. This has the effect of reducing the effective area of the outside of the feedback bellows by the area of the shaft. Since the effective area of the inside of the bellows is slightly larger than that of the outside, there will be a slight net upward motion when the output pressure is increased, and vice versa.

The same circuitry as the auto reset controllers is used for the proportional plus auto reset plus derivative mode, except that the passage from the volume to the inside of the feedback bellows is interrupted by an add-on derivative package. Tube fittings are put in the controller casting to connect to the derivative unit by flexible tubing. In the unit itself, a spring diaphragm unit gives compensated derivative action, and an additional needle valve is used for setting derivative time. For sizing purposes and because of the two needle valves operating in the same volume, a 1-to-1 relay is used. Since the nozzle in a 1-to-1 relay is vented to atmosphere, this has the effect of producing an infinite volume, thus reducing the size of the positive volume in the derivative section. All restrictions are then in the positive feedback, leaving the negative feedback unrestricted for better pneumatic stability.

The various modes of control and the manner in which the controller disclosed herein may be used in these modes, may be the same as those described in the above-noted patent and in the cited "Instruction Bulletin," in conjunction with controllers of different design.

While there has been shown and described a preferred embodiment of pneumatic controller in accordance with the invention, it will be appreciated that many changes and modifications may be made therein without, however, departing from the essential spirit of the invention. For example, in lieu of bellows 25, one may use other forms of pressure-responsive transducers, such as capsules or diaphragms, to convert a pneumatic pressure value to a mechanical motion.

We claim:

1. A pneumatic controller comprising:

A. a flapper-nozzle assembly including:
      a. a nozzle through which fluid is flowable, the longitudinal axis of said nozzle lying along a Y-axis or in parallel relation thereto;
      b. a pivoted flapper having a blade section and a flat tab section at right angles thereto so arranged that deflection of the tab section causes the blade section to move relative to the orifice of the nozzle to more or less throttle the rate of fluid flow therethrough;
   B. means mounting said flapper-nozzle assembly for rotation about said Y-axis whereby angular orientation of the plane of the tab section may be varied with respect to said Y-axis;
   C. an actuating-arm assembly including:
      a. a swizzle stick alignable with said Y-axis and having a contact element at one end engaging the surface of said tab section;
      b. a transverse staff secured to said swizzle stick and extending along an X-axis perpendicular to said Y-axis; and
      c. bearing means supporting said staff for rotational movement as well as movement along said X-axis whereby said stick may be both swiveled and translated with respect to said X-axis;
   D. a fluid-pressure-responsive transducer disposed below said swizzle stick in alignment with said X-axis, the lower end of said staff being in contact with the face of said transducer to cause said staff to rise and fall along said X-axis in accordance with the pressure applied to the transducer;
   E. means to apply an error motion to said stick to cause it to swivel accordingly; and
   F. means to apply feedback pressure as a function of nozzle back pressure to said transducer to produce a feedback motion causing said staff to translate along said X-axis, whereby the influence of said contract element on the deflection of said tab is a resultant of error and feedback motion and depends on the angular orientation of the plane of the tab.

2. A controller as set forth in claim 1, wherein said contact element is a ball.

3. A controller as set forth in claim 1 wherein said transducer is a bellows.

4. A controller as set forth in claim 1, wherein said means mounting said flapper-nozzle assembly includes a cylinder, said assembly being mounted on one end of the cylinder, and a handwheel secured to the other end of the cylinder and having a graduated dial thereon.

5. A controller as set forth in claim 4, wherein said dial is calibrated from zero to 360°.

6. A controller as set forth in claim 1, wherein said error motion is produced by a linkage responsive to a process variable and to a set point to produce an error motion depending on the departure of the process variable from the set point.

7. A controller as set forth in claim 1, further including means to vary the position of said transducer along said X-axis.

8. A controller as set forth in claim 7, wherein said means includes a gear supporting said transducer, said gear being screwed on a threaded post aligned with the X-axis, and a pinion engaging the gear to shift the position of the transducer on the post.

9. A controller as set forth in claim 1, further including means to apply a pressure to the upper end of the staff to maintain the lower end thereof in contact with the face of the transducer.

10. A controller as set forth in claim 1, further including spring means normally urging said flapper blade section toward said orifice.

11. A controller as set forth in claim 1, wherein said bearing means are constituted by jewel bearings disposed on either side of said staff.